United States Patent Office 3,641,070
Patented Feb. 8, 1972

3,641,070
HALOGEN-PREGNADIENES
Georg Anner and Ludwig Ehmann, Basel, Switzerland, assignors to Ciba Corporation, Summit, N.J.
No Drawing. Filed June 25, 1969, Ser. No. 836,601
Claims priority, application Switzerland, June 28, 1968, 9,707/68
Int. Cl. C07c 169/34
U.S. Cl. 260—397.45
17 Claims

ABSTRACT OF THE DISCLOSURE

The invention concerns compounds of the general formula

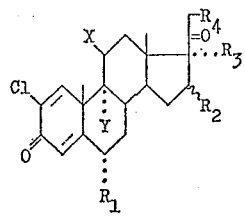

wherein $R_1$ is H, $CH_3$ or a halogen atom
$R_2$ is H or $CH_3$
$R_3$ is a free or esterified hydroxyl group
$R_4$ is a free, esterified or etherified hydroxy group, and
X and Y each represent a halogen atom.

Use: as antiphlogistics.

The present invention provides new steroids of the pregnane series, substituted in position 2 by chlorine, of the general formula

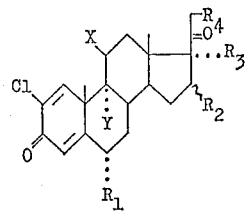

(I)

in which $R_1$ represents hydrogen, a methyl group or a halogen atom, $R_2$ hydrogen or an α- or β-positioned methyl group, $R_3$ a free or esterified hydroxyl group, especially a hydroxyl group esterified with a lower alkanecarboxylic acid, $R_4$ represents a free, esterified or etherified hydroxyl group, X and Y each represents a halogen atom, as well as a process for their manufacture.

The above-mentioned esterified hydroxyl groups are especially those which are derived from organic carboxylic acids of the aliphatic, alicyclic, aromatic or heterocyclic series, especially those which contain 1 to 18 carbon atoms, for example from formic, acetic, propionic acid, the butyric or valeric acids such as n-valeric acid, or trifluoro- or trimethylacetic acid, the caproic acids such as β-trimethylpropionic acid or diethylacetic acid, of oenanthic, caprylic, pelargonic or capric acid, of undecylic acids, for example undecylenic acid, from lauric, myristic, palmitic or stearic acids, for example oleic acid, cyclopropane-, -butane-, -pentane- and -hexane-carboxylic acid, cyclopropylmethanecarboxylic, cyclohexylethanecarboxylic acid, cyclopentylethanecarboxylic, cyclohexylethanecarboxylic acid, from cyclopentyl-, cyclohexyl- or phenylacetic or propionic acids, from benzoic acid, phenoxyalkane acids such as phenoxyacetic acid, dicarboxylic acids such as succinic acid, phthalic, quinolic acid, furan-2-carboxylic, 5-tertiary butyl-furan-2-carboxylic, 5-bromofuran-2-carboxylic acid, nicotinic or isonicotinic acid, or from sulphonic acids such as benzenesulphonic acids or from inorganic acids, for example phosphoric or sulphuric acids.

The ester groups may also be derived from orthocarboxylic acids such as orthoformic acid, orthoacetic or orthopropionic acid, and these acids—like the abovementioned dicarboxylic acids—may furnish cyclic 17,21-esters.

As etherified hydroxyl groups those may be specially mentioned which are derived from alcohols with 1 to 18 carbon atoms, such as lower aliphatic alkanols, ethanol, methanol, propanol, isopropanol, the butyl or amyl alcohols or cycloalkanols such as cyclopentanol or from araliphatic alcohols, especially from monocyclic aryllower aliphatic alcohols such as benzyl alcohol, or from heterocyclic alcohols such as α-tetrahydro-pyranol or -furanol.

The halogen atoms are bromine atoms or especially chlorine or fluorine atoms.

The new compounds of the above Formula I possess valuable pharmacological properties. Thus they have especially a local anti-inflammatory effect as can be shown in animal tests, for example on rats, with doses from 0.001 to 0.1 mg. administered locally in the foreign body granuloma test. The new compounds may therefore be used as local antiphlogistics. However, the new compounds are also valuable intermediates for the manufacture of other useful substances, especially of pharmacologically active compounds.

Especially valuable are those compounds of the above formula in which $R_1$ represents a hydrogen or fluorine atom, $R_2$ an α-methyl group, $R_3$ hydrogen or the residue of a lower alkanecarboxylic acid, $R_4$ a free, esterified hydroxyl group or a hydroxyl group etherified with a lower alkanol, tetrahydrofuranol or tetrahydropyranol, and X represents a chlorine atom and Y is a chlorine or fluorine atom, and in the very first place 6α-fluoro-2,9α,11β-trichloro-16α-methyl-17α-hydroxy-21-acetoxy-3,20-dioxopregna-1,4-diene and 2,9α,11β-trichloro-16α-methyl-17α-hydroxy-21-acetoxy-3,20-dioxopregna-1,4-diene which, for example on local administration to the rat in a dose from 0.003 to 0.01 mg., produce a distinct anti-inflammatory effect.

The compounds of the above Formula I are obtained when a compound of the general formula

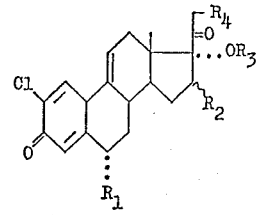

(II)

in which $R_1$, $R_2$, $R_3$ and $R_4$ have the above meanings, is reacted in known manner with a compound that gives off positively charged halogen in the presence of halogen anions or when chlorine is added on to the 1,2-double bond in a compound of the formula

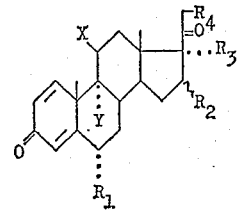

in which $R_1$, $R_2$, $R_3$, $R_4$, X and Y have the meanings given above, and hydrochloric acid is eliminated from the resulting 1,2-dichloro compound, and, if desired, in a resulting compound a free hydroxyl group present is esterified and/or the 21-hydroxy group is etherified and/or esterified or etherified hydroxyl groups are converted into free hydroxyl groups.

As the compound that gives off positively charged halogen there is especially used an N-halogenamide or N-halogenimide, such as N-bromo- or N-chlorosuccinimide or -phthalimide, N-bromo- or N-chloro-acetamide, N-chloro- or N-bromotoluenesulphonylamide. The reaction is carried out in the presence of halogen anions, such as chlorine, bromine or fluorine anions, especially in the form of the corresponding alkali metal, especially potassium or lithium, halides or of the corresponding hydrohalic acids. For this purpose the positively charged halogen may be different from the halogen anion. The reaction is preferably performed in an organic solvent such as a lower aliphatic carboxylic acid, for example acetic, diethylacetic, propionic or butyric acid, or in an ether such as tetrahydrofuran or dioxan, or in a halogenated hydrocarbon such as methylenechloride or chloroform, or in a mixture of such solvents.

The addition of chlorine to the 1,2-double bond according to method (b) is performed in a manner known per se. For example, the chlorination may be performed in an inert solvent, such as dioxan, in the presence of a carboxylic acid, such as for example propionic acid, at a low temperature in the dark. The elimination of hydrogen chloride from the 1,2-dichloro compounds is performed by treatment with a base, preferably a tertiary organic nitrogen base, for example triethylamine, pyridine or collidine.

According to this invention the free hydroxyl groups in 17- and 21-positions may, if desired, be esterified, and both 17α- or 21-monoesters and 17α,21-diesters may be manufactured. To manufacture 21-monoesters the 21-hydroxy compounds are treated in known manner with reactive functional carboxylic acid derivatives, preferably with those of the acids mentioned above, for example with an acid anhydride or acid halide, for example in a tertiary base such as pyridine.

A free hydroxyl group in position 17α may be selectively esterified in known manner; for example, the 17α,21-diesters are manufactured by acylation with a carboxylic acid anhydride, for example acetic anhydride, with addition of a strong acid, especially an aromatic sulphonic acid, for example p-toluenesulphonic acid, as catalyst and the 21-ester group is then hydrolyzed under mild conditions, for example with a solution of an alkali metal carbonate or bicarbonate in an aqueous aliphatic alcohol such as methanol or ethanol.

17α-monoesters may also be manufactured by the following known route: When compounds of the Formula I, that contain free hydroxyl groups in positions 17α and 21, are reacted with an orthoester of the type R'—C(OR")$_3$ [where R' is a hydrogen atom or an alkyl radical and R" an alkyl radical] in the presence of a strong acid, for example p-toluenesulphonic acid, as catalyst, in an inert solvent, for example benzene, cyclic 17α,21-orthoesters are obtained. By hydrolysis with a weak organic acid, for example oxalic acid, the 21-ester bond is then selectively hydrolyzed and a 17α-monoester is obtained.

According to the present invention, if desired, a free hydroxyl group in position 21 is etherified in known manner, preferably with a reactive derivative of one of the alcohols mentioned above. For example, reaction with dihydropyran in a solvent that does not participate in the reaction, such as tetrahydrofuran, diethyl ether or chloroform, in the presence of phosphorus oxychloride, furnishes the 21-tetrahydropyranyl ethers.

The compounds of the above Formula II to be used as starting materials can be prepared, for example, by the process of our application Ser. No. 776,270, filed Nov. 15, 1968.

The invention includes also any variant of the present process in which an intermediate obtained at any stage of the process is used as starting material and the remaining steps are carried out or the process is discontinued at any stage thereof, or in which a starting material is formed under the reaction conditions.

The invention further includes the formulation of pharmaceutical preparations for use in human or veterinary medicine containing the new pharmacologically active substances of this invention as active ingredient in conjunction or admixture with a pharmaceutical excipient. The excipient used is an organic or inorganic substance suitable for enteral, for example oral or parenteral or local administration. Suitable excipients are substances that do not react with the new compounds, for example gelatin, water, lactose, starches, magnesium stearate, talcum, vegetable oils, benzyl alcohols, gums, polyalkyleneglycols, while petroleum jelly, cholesterol or other known medicinal excipients. The pharmaceutical preparations may be in solid form, for example tablets, dragées or capsules, or in liquid or semiliquid form solutions, suspensions, emulsions, ointments or creams. These pharmaceutical preparations may be sterilized and/or contain assistants such as preserving, stabilizing, wetting or emulsifying agents, salts for regulating the osmotic pressure or buffers. They may also contain further therapeutically valuable substances. The new compounds may also be used as starting materials for the manufacture of other valuable substances.

The following examples illustrate the invention.

EXAMPLE 1

12.9 grams of $\Delta^{1,4,9(11)}$-6α-fluoro-2-chloro-16α-methyl-17α-hydroxy-21-acetoxy-3,20-dioxopregnatriene and after this 55 g. of finely powdered lithium-chloride are dissolved with stirring and moderate heating to 30–40° C. in 440 ml. of glacial acetic acid. The resulting solution is then cooled under nitrogen with ice water to 1–3° C. and there are added in one lot 5.28 g. of N-chlorosuccinimide and then 13.8 ml. of a solution of 70 g. of hydrogen chloride in 700 ml. of tetrahydrofuran. The cooling bath is then removed and the batch is stirred for 2 to 3 hours under nitrogen at an internal temperature slowly rising to 25° C. during which the unreacted chlorosuccinimide gradually dissolves. The clear, faintly yellowish reaction solution, which then still contains excess N-chlorosuccinimide, is poured out over 3 litres of ice water, extracted with 3× 300 ml. of methylenechloride and the extracts are successively washed with water, saturated aqueous sodium bicarbonate solution and again with water. The washed, combined extracts are dried over sodium sulphate, filtered and evaporated under vacuum. For purification the resulting crystalline crude product (17.0 g.) is dissolved in methylenechloride, filtered through 730 g. of silica gel and further eluted with methylenechloride. The middle fraction is mixed with ether and concentrated and furnishes 6.0 g. of $\Delta^{1,4}$-6α-fluoro-2,9α,11β-trichloro-16α-methyl- - 17α - hydroxy-21-acetoxy-3,20-dioxopregnadiene melting at (247° C.) 248–249° C. after decomposition. Optical rotation $[\alpha]_D^{20°} = +103 \pm 1°$.

(c.=1.181%)

in dioxan). $\lambda_{max}$ (in rectified alcohol) 246 m$\mu$ ($\epsilon$=15,700).

On working up the mother liquor furnishes more of the identical product.

EXAMPLE 2

2.60 grams of $\Delta^{1,4}$-6α-fluoro-2,9α,11β-trichloro-16α-methyl-17α-hydroxy-21-acetoxy - 3,20 - dioxopregnadiene are dissolved in 200 ml. of methanol with heating to the boil and passing nitrogen through. The resulting solution is then cooled under nitrogen to 1 to 3° C. and within 30 to 60 minutes a solution of 0.5 g. of sodium bicarbonate in 10 ml. of water is dropped in. The reaction solution is then further stirred overnight at 1–3° C. under nitrogen, during which the reaction product crystallizes gradually. The progress of the hydrolysis is checked by thin-layer chromatography on silica gel with 1:1 toluene-ethyl+acetate as eluant. After a hydrolysis time of 10 to 15 hours no starting material can be identified in the reaction solution. At that moment the reaction mixture is poured into 1.5 litres of water, repeatedly extracted with methylene-chloride; the extracts are repeatedly washed with water, dried over sodium sulphate, filtered and the filtrate is evaporated to dryness. The yield of crystalline product amounts to 2.4 g. melting at 232–233° C. The product is thin-layer chromatographically pure (silica gel toluene+ethyl acetate 1:1). For further purification the faintly yellowish crude product is crystallized from methanol, to yield at first 1.0 g. of $\Delta^{1,4}$-6α-fluoro-2,9α,11β-trichloro-16α-methyl-17α,21-dihydroxy - 3,20 - dioxopregnadiene melting at (231) 232–233° C.

Concentration of the mother liquor furnishes more of the identical product.

EXAMPLE 3

1.3 ml. of trimethylacetylchloride are dissolved with stirring under nitrogen in 25 ml. of pure, anhydrous pyridine at 0° C. In the course of 5 minutes, while stirring at 0° C. under nitrogen, a solution of 1.0 g. of $\Delta^{1,4}$-6α-fluoro-2,9α,11β-trichloro - 16α - methyl - 17α,21 - dihydroxy-3,20-dioxopregnadiene in 15 ml. of pure anhydrous pyridine is run in. The reaction solution is stirred under nitrogen for 8–12 hours at 0° C., after which no starting material can be identified in the reaction mixture by means of thin-layer chromatography (silica gel; toluene+ethyl acetate 1:1). The reaction solution is then poured out over ice water and acidified with dilute hydrochloric acid. The reaction products are extracted with ethyl acetate and the ethyl acetate extracts are washed successively with dilute hydrochloric acid, water dilute sodium carbonate solution and water, dried over sodium sulphate, filtered and evaporated. The white, finely crystalline residue (1.3 g.) is recrystallized from ethyl acetate and yields pure $\Delta^{1,4}$-6α-fluoro-2,9α,11β-trichloro-16α-methyl-17α-hydroxy - 21 - trimethylacetoxy - 3,20 - dioxopregnadiene melting at 215–217° C.

An analogous reaction of $\Delta^{1,4}$-6α-fluoro-2,9α,11β-trichloro-16α-methyl - 17α,21 - dihydroxy-3,20-dioxopregnadiene with undecylenic acid chloride furnishes $\Delta^{1,4}$-6α-fluoro-2,9α,11β-trichloro-16α-methyl - 17α - hydroxy - 21-undecenylenoyloxy-3,20-dioxopregnadiene, with succinic anhydride $\Delta^{1,4}$-6α-fluoro-2,9α,11β-trichloro-16α-methyl-17α-hydroxy-21-hemisuccinoyloxy-3,20-dioxopregnadiene, with diglycollic anhydride $\Delta^{1,4}$-6α-fluoro-2,9α,11β-trichloro-16α-methyl-17α-hydroxy-21-hemidiglycoloyloxy-3,20-dioxopregnadiene, with quinolic anhydride $\Delta^{1,4}$-6α-fluoro-2,9α,11β-trichloro-16α-methyl-17α-hydroxy-21-hemiquinolinoxyloxy-3,20-dioxopregnadiene, with propionic anhydride $\Delta^{1,4}$-6α-fluoro-2,9α,11β-trichloro-16α-methyl-17α-hydroxy-21-propionyloxy-3,20-dioxopregnadiene, with benzoic acid chloride $\Delta^{1,4}$-6α-fluoro-2,9α,11β-trichloro-16α-methyl-17α-hydroxy-21-benzoyloxy-3,20-dioxopregnadiene, with β-phenylpropionylchloride $\Delta^{1,4}$-6α-fluoro-2,9α,11β-trichloro-16α-methyl-17α-hydroxy-21β-phenylpropionyloxy-3,20-dioxopregnadiene, with chloroacetylchloride $\Delta^{1,4}$-6α-fluoro-2,9α,11β-trichloro-16α-methyl-17α-hydroxy-21-chloroacetoxy-3,20-dioxopregnadiene.

EXAMPLE 4

A mixture of 4.8 g. of $\Delta^{1,4}$-6α-fluoro-2,9α,11β-trichloro-16α-methyl-17α,21-dihydroxy - 3,20 - dioxopregnadiene, 0.025 g. of p-toluenesulphonic acid, 6.0 ml. of dimethyl-formamide and 6.0 ml. of orthopropionic acid triethyl ester is heated for 4 hours at 115° C. while being stirred under nitrogen. The clear reaction solution is then cooled, 0.5 ml. of pyridine is added and the whole is completely evaporated under vacuum. The crystalline residue is triturated with 25 ml. of methanol, suctioned off and washed with a small quantity of cooled methanol and finally dried at 60–70° C. under vacuum, to yield pure $\Delta^{1,4}$-6α-fluoro-2,9α,11β-trichloro - 16α - methyl-17α,21-(1'-ethoxy)-propylidenedioxy-3,20-dioxopregnadiene in fine needles.

By an analogous reaction of $\Delta^{1,4}$-6α-fluoro-2,9α,11β-trichloro-16α-methyl-17α,21 - dihydroxy-3,20-dioxopregnadiene there are obtained with orthoacetic acid triethyl ester $\Delta^{1,4}$-6α-fluoro-2,9α,11β-trichloro-16α-methyl-17α,21-(1'-ethoxy)-ethylidenedioxy-3,20-dioxopregnadiene, with orthovaleric acid trimethyl ester $\Delta^{1,4}$-6α-fluoro-2,9α, 11β-trichloro-16α-methyl-17α,21-(1'-methoxy)-pentylidenedioxy-3,20-dioxopregnadiene, with orthobenzoic acid triethyl ester $\Delta^{1,4}$-6α-fluoro-2,9α, 11β-trichloro-16α-methyl-17α,21-(1'-ethoxy)-benzylidenedioxy-3,20-dioxopregnadiene, with cyclopentanone diethylacetal $\Delta^{1,4}$-6α-fluoro-2,9α, 11β-trichloro-16α-methyl-17α,21cyclopentylidenedioxy-3,20-dioxopregnadiene, with benzaldehyde diethylacetal $\Delta^{1,4}$-6α-fluoro-2,9α,11β-trichloro-16α-methyl-17α,21-benzylidenedioxy-3,20-dioxopregnadiene and with β-carbomethoxyorthopropionic acid trimethyl ester $\Delta^{1,4}$-6α-fluoro-2,9α,11β-trichloro-16α-methyl-17α,21-(1'-methoxy-3'-carbomethoxy)-propylidenedioxy-3, 20-dioxopregnadiene.

A mixture of a methanolic solution of $\Delta^{1,4}$-6α-fluoro-2,9α,11β-trichloro - 16α - methyl-17α,21-(1'-methoxy-3'-carbomethoxy) - propylidenedioxy - 3,20-dioxopregnadiene with an aqueous solution of sodium bicarbonate is stirred under nitrogen until starting material can no longer be identified by thin-layer chromatography. The solution is poured into ice water, acidified with dilute hydrochloric acid and extracted with methylenechloride. The extract is evaporated and the oily residue taken up in methylenechloride, whereupon crystalline $\Delta^{1,4}$-6α-fluoro 2,9α,11β-trichloro - 16α - methyl - 17α,21-(1'-methoxy-3'-carboxy) - propylidenedioxy - 3,20-dioxopregnadiene is obtained. The new compound is soluble in an aqueous sodium bicarbonate solution.

EXAMPLE 5

A suspension of $\Delta^{1,4}$-6α-fluoro-2,9α,11β-trichloro-16α-methyl-17α,21-(1' - ethoxy) - propylidenedioxy-3,20-dioxopregnadiene in methanol is treated at 45° C. with a 2 N-solution of oxalic acid in water until a clear solution has formed. The solution is then poured into a saturated aqueous solution of sodium bicarbonate and extracted with methylenechloride. The extracts are washed with water, dried and evaporated. Recrystallizaiton of the residue from ethyl acetate furnishes $\Delta^{1,4}$-6α-fluoro-2, 9α,11β-trichloro - 16α - methyl-21-hydroxy-17α-propionyloxy-3,20-dioxopregnadiene.

By an analogous reaction of $\Delta^{1,4}$-6α-fluoro-2,9α,11β-trichloro-16α - methyl-17α,21-(1' - methoxy-3'-carboxypropylidenedioxy-3,20-dioxopregnadiene, by splitting with dilute aqueous oxalic acid, $\Delta^{1,4}$-6α-fluoro-2,9α,11β-trichloro-16α-methyl-21-hydroxy-17α - hemisuccinoyloxy-3, 20-dioxopregnadiene which is soluble in an aqueous sodium bicarbonate solution, and $\Delta^{1,4}$-6α-fluoro-2,9α,11β-trichloro-16α-methyl - 17α,21-(1'-methoxy)-pentylidenedioxy-3,20-dioxopregnadiene yields $\Delta^{1,4}$-6α-fluoro-2,9α,11β-trichloro-16α-methyl-21-hydroxy-17α-n-valeryloxy-3,20-dioxopregnadiene,
$\Delta^{1,4}$-6α-fluoro-2,9α,11β-trichloro-16α-methyl-17α,21-benzylidenedioxy-3,20-dioxopregnadiene, yields
$\Delta^{1,4}$-6α-fluoro-2,9α,11β-trichloro-16α-methyl-21-hydroxy-17α-benzoyloxy-3,20-dioxopregnadiene, and
$\Delta^{1,4}$-6α-fluoro-2,9α,11β-trichloro-16α-methyl-17α,21-

(1′-ethoxy)-ethylidenedioxy-3,20-dioxopregnadiene yields
$\Delta^{1,4}$-6α-fluoro-2,9α,11β-trichloro-16α-methyl-21-hydroxy-17α-acetoxy-3,20-dioxopregnadiene.

EXAMPLE 6

A solution of $\Delta^{1,4}$-6α-fluoro-2,9α,11β-trichloro-16α-methyl-17α,21-dihydroxy-3,20-dioxopregnadiene in methyl iodide prepared with the addition of dimethylformamide is mixed with silver oxide, stirred at room temperature until starting material can no longer be detected by thin-layer chromatography. The silver salts are separated, the clear reaction solution completely evaporated and the residue purified by chromatography on silica gel. When the middle fraction is recrystallized from methanol, it furnishes $\Delta^{1,4}$-6α-fluoro-2,9α,11β-trichloro-16α-methyl-17α-hydroxy - 21-methoxy-3,20-dioxopregnadiene.

An analogous reaction of $\Delta^{1,4}$-6α-fluoro-2,9α,11β-trichloro-16α-methyl-17α,21 - dihydroxy - 3,20-dioxopregnadiene with ethyl iodide furnishes $\Delta^{1,4}$-6α-fluoro-2,9α, 11β-trichloro-16α-methyl-17α - hydroxy-21-ethoxy-3,20-dioxopregnadiene, with allyl iodide $\Delta^{1,4}$-6α-fluoro-2,9α, 11β-trichloro-16α-methyl-17α - hydroxy-21-allyloxy-3,20-dioxopregnadiene, with benzyl iodide $\Delta^{1,4}$-6α-fluoro-2,9α, 11β-trichloro-16α-methyl-17α-hydroxy - 21-benzyloxy-3, 20-dioxopregnadiene.

EXAMPLE 7

$\Delta^{1,4}$-6α-fluoro - 2,9α,11β-trifluoro-16α - methyl-17α,21-dihydroxy-3,20-dioxopregnadiene is dissolved in 3,4-dihydropyran with addition of p-toluenesulphonic acid monohydrate and stirred at room temperature until no more starting material can be identied by thin-layer chromatography. The reacted p-toluenesulphonic acid is neutralized with pyridine and the reaction solution is completely evaporated under vacuum. Recrystallization of the residue from ethyl acetate furnishes pure $\Delta^{1,4}$-6α-fluoro-2,9α,11β-trichloro - 16α - methyl-17α-hydroxy-21-(2′-tetrahydropyranyloxy)-3,20-dioxopregnadiene.

An identical reaction of $\Delta^{1,4}$-6α-fluoro-2,9α,11β-trichloro-16α-methyl - 17α,21 - dihydroxy-3,20-dioxopregnadiene with 2,5-dihydrofuran furnishes $\Delta^{1,4}$-6α-fluoro-2,9α,11β-trichloro-16α-methyl-17α-hydroxy-21-(2′-tetrahydrofuranyloxy)-3,20-dioxopregnadiene,
with methylvinyl ether $\Delta^{1,4}$-6α-fluoro-2,9α,11β-trichloro-16α-methyl-17α-hydroxy-21-(1′-methoxyethoxy)-3, 20-dioxopregnadiene,
with phenylvinyl ether $\Delta^{1,4}$-6α-fluoro-2,9α,11β-trifluoro-16α-methyl-17α-hydroxy-21-(1′-phenoxyethoxy)-3, 20-dioxopregnadiene,
with n-butylvinyl ether $\Delta^{1,4}$-6α-fluoro-2,9α,11β-trichloro-16α-methyl-17α-hydroxy-21-(1′-n-butoxyethoxy)-3, 20-dioxopregnadiene,
with isobutylvinyl ether $\Delta^{1,4}$-6α-fluoro-2,9α,11β-trichloro-16α-methyl-17α-hydroxy-21-(1′-isobutoxyethoxy)-3,20-dioxopregnadiene,
with n-cetylvinyl ether $\Delta^{1,4}$-6α-fluoro-2,9α,11β-trichloro-16α-methyl-17α-hydroxy-21-(1′-cetyloxyethoxy)-3, 20-dioxopregnadiene,
with n-octadecylvinyl ether $\Delta^{1,4}$-6α-fluoro-2,9α,11β-trichloro-16α-methyl-17α-hydroxy-21-(1′-octadecyloxyethoxy)-3,20-dioxo-pregnadiene,
with benzylvinyl ether $\Delta^{1,4}$-6α-fluoro-2,9α,11β-trichloro-16α-methyl-17α-hydroxy-21-(1′-benzyloxyethoxy)-3,20-dioxopregnadiene.

EXAMPLE 8

1.17 grams of $\Delta^{1,4(11)}$-6α-fluoro-2-chloro-16α-methyl-17α-hydroxy-21-acetoxy-3,20-dioxopregnadiene are dissolved in 75 ml. of diethylacetic acid and, while stirring, 5 ml. of a solution of hydrogen fluoride in chloroform+tetrahydrofuran 3:2, containing 0.270 g. of hydrogen fluoride per ml. of solution, is run in, and immediately after this 0.395 g. of N-bromoacetamide is added. The batch is stirred for 15–20 hours at room temperature and then poured into ½ litre of 10% aqueous sodium carbonate solution. The precipitate reaction products are dissolved in methylenechloride and the solution is washed neutral, dried and evaporated. The yield of crude product amounts to 1.3 g. of $\Delta^{1,4}$-6α,11β-difluoro-2-chloro-9α-bromo-16α-methyl-17α-hydroxy - 21-acetoxy-3,20-dioxopregnadiene which is purified by recrystallization from ethyl acetate.

EXAMPLE 9

25.4 grams of $\Delta^{1,4}$-6α,11β-difluoro-2-chloro-9α-bromo-16α - methyl-17α-hydroxy-21-acetoxy-3,20-dioxopregnadiene are dissolved in 200 ml. of methanol with heating at the boil and while passing nitrogen through. The resulting solution is then cooled to 0° C. under nitrogen, and within 30–60 minutes a solution of 0.50 g. of sodium bicarbonate in 10 ml. of water is dropped in. The reaction solution is then stirred on overnight at 0° C. under nitrogen. The progress of the hydrolysis is checked by means of thin-layer chromatography. After a hydrolysis period of 10–15 hours starting material can no longer be identified in the reaction solution and at that moment the reaction mixture is poured into 1520 ml. of water, repeatedly extracted with methylenechloride, and the extracts are washed repeatedly with water, dried over sodium sulphate and completely evaporated. Yield of crude product: 2.5 g. of $\Delta^{1,4}$-6α, 11β - difluoro-2-chloro-9α-bromo-16α-methyl-17α,21-dihydroxy-3,20-dioxopregnadiene which furnishes pure $\Delta^{1,4}$-6α,11β - difluoro - 2-chloro-9α-bromo-16α-methyl-17α,21-dihydroxy - 3,20 - dioxopregnadiene on recrystallization from methanol.

To manufacture $\Delta^{1,4}$-6α,11β-difluoro-2-chloro-9α-bromo - 16α - methyl-17α-hydroxy-21-trimethylacetoxy-3,20-dioxopregnadiene 1.3 ml. of trimethylacetylchloride are dissolved at 0° C. in 25 ml. of pyridine, then a solution of 0.9 of $\Delta^{1,4}$-6α,11β-difluoro-2-chloro-9α-bromo-16α-methyl-17α,21-dihydroxy - 3,20 - dioxopregnadiene in 15 ml. of pyridine is run in at 0° C. and the whole is stirred for 10–15 hours at 0° C. For working up the reaction solution is poured into ice water, the precipitated reaction products are extracted with ethyl acetate, the extracts are washed successively with dilute hydrochloric acid, water, dilute sodium carbonate solution and water, dried and completely evaporated. The white, finely crystalline residue is recrystallized from ethyl acetate and furnishes pure $\Delta^{1,4}$-6α,11β - difluoro - 2-chloro-9α-bromo-16α-methyl-17α-hydroxy-21-trimethylacetoxy-3,20-dioxopregnadiene.

An analogous reaction of $\Delta^{1,4}$-6α,11β-difluoro-2-chloro-9α - bromo-16α-methyl-17α,21-dihydroxy-3,20-dioxopregnadiene with n-valeroylchloride furnishes $\Delta^{1,4}$-6α,11β-difluoro-2-chloro-9α-bromo-16α-methyl-17α-hydroxy-21-n-valeroyloxy-3,20-dioxopregnadiene,
with undecylenic acid chloride $\Delta^{1,4}$-6α,11β-difluoro-2-chloro-9α-bromo-16α-methyl-17α-hydroxy-21-undecylenoyloxy-3,20-dioxopregnadiene,
with benzoylchloride $\Delta^{1,4}$-6α,11β-difluoro-2-chloro-9α-bromo-16α-methyl-17α-hydroxy-21-benzoyloxy-3,20-dioxopregnadiene,
with β-phenylpropionyl-chloride $\Delta^{1,4}$-6α,11β-difluoro-2-chloro-9α-bromo-16α-methyl-17α-hydroxy-21-β-phenylpropionyloxy-3,20-dioxopregnadiene,
with chloroacetylchloride $\Delta^{1,4}$-6α,11β-difluoro-2-chloro-9α-bromo-16α-methyl-17α-hydroxy-21-chloroacetoxy-3,20-dioxopregnadiene and
with methanesulphonylchloride $\Delta^{1,4}$-6α,11β-difluoro-2-chloro-9α-bromo-16α-methyl-17α-hydroxy-21-mersyloxy-3,20-dioxopregnadiene.

A mixture of 1.0 g. of $\Delta^{1,4}$-6α,11β-difluoro-2-chloro-9α-bromo - 16α - methyl-17α,21-dihydroxy-3,20-dioxopregnadiene and 1.0 g. of succinic anhydride in 25 ml. of pyridine is heated for several hours on a boiling water bath. The reaction solution is cooled, extensively concentrated under vacuum and the residue is dissolved in ethyl acetate and washed with dilute hydrochloric acid and water and concentrated until crystallization sets in, to furnish $\Delta^{1,4}$-6α, 11β - difluoro - 2 - chloro - 9α-bromo-16α-mehtyl-17α-hydroxy-21-hemisuccinoyloxy-3,20-dioxopregnadiene.

An analogous reaction of $\Delta^{1,4}$-6α,11β-difluoro-2-chloro-9α - bromo-16α-methyl-17α,21-dihydroxy-3,20-dioxopregnadiene with glycollic anhydride furnishes $\Delta^{1,4}$-6α,11β-difluoro-2-chloro-9α-bromo-16α-methyl-17α-hydroxy-21-hemidiglycoloyloxy-3,20-dioxopregnadiene, with phthalic anhydride $\Delta^{1,4}$-6α,11β-difluoro-2-chloro-9α-bromo-16α-methyl-17α-hydroxy-21-hemiphthaloyloxy-3,20-dioxopregnadiene, with quinolic anhydride $\Delta^{1,4}$-6α-11β-difluoro-2-chloro-9α-bromo-16α-methyl-17α-hydroxy-21-hemiquinoyloxy-3,20-dioxopregnadiene, with propionic anhydride $\Delta^{1,4}$-6α,11β-difluoro-2-chloro-9α-bromo-16α-methyl-17-hydroxy-21-propionyloxy-3,20-dioxopregnadiene.

A mixture of 5.0 g. of $\Delta^{1,4}$-6α,11β-difluoro-2-chloro-9α-bromo - 16α-methyl-17α,21-dihydroxy-3,20-dioxopregnadiene, 0.02 g. of p-toluenesulphonic acid monohydrate, 6.0 ml. of dimethylformamide and 6.0 ml. of orthopropionic acid triethyl ester is heated for 4 hours at 110° C. while being stirred under nitrogen. The clear reaction solution is cooled, 0.5 ml. of pyridine is added and the whole is completely evaporated under vacuum. The crystalline residue is triturated with 25 ml. of methanol, suctioned off, rinsed with a small quantity of cooled methanol and finally dried at 60–70° C. under vacuum, to yield pure $\Delta^{1,4}$ - 6α,11β-difluoro-2-chloro-9α-bromo-16α-methyl-17α, 21 - (1'-ethoxy)-propylidenedioxy-3,20-dioxopregnadiene in fine needles.

In an analogous manner $\Delta^{1,4}$-6α,11β-difluoro-2-chloro-9α - bromo-16α-methyl-17α,21-dihydroxy-3,20-dioxopregnadiene yields with orthoacetic acid triethyl ester $\Delta^{1,4}$-6α,11β-difluoro-2-2-chloro-9α-bromo-16α-methyl-17α,21-(1'-ethoxy)-ethylidenedioxy-3,20-dioxopregnadiene, with orthobenzoic acid triethyl ester $\Delta^{1,4}$-6α,11β-difluoro-2-chloro-9α-bromo-16α-methyl-17α,21-(1'-ethoxy)-benzylidenedioxy-3,20-dioxopregnadiene, with ortho-n-valeric acid trimethyl ester $\Delta^{1,4}$-6α,11β-difluoro-2-chloro-9α-bromo-16α-methyl-17α,21-(1'-methoxy)-pentylidenedioxy-3,20-dioxopregnadiene, with cyclopentanone diethyl acetal $\Delta^{1,4}$-6α,11β-difluoro-2-chloro-9α-bromo-16α-methyl-17α,21-cyclopentylidene-dioxy-3,20-dioxopregnadiene.

with benzaldehyde diethyl acetal $\Delta^{1,4}$-6α,11β-difluoro-2-chloro-9α-bromo-16α-methyl-17α,21-benzylidenedioxy-3,20-dioxopregnadiene and with β-carbomethoxy-orthopropionic acid trimethyl ester $\Delta^{1,4}$-6α,11β-difluoro-2-chloro-9α-bromo-16α-methyl-17α,21-(1'-methoxy-3'-carbomethoxy)-propylidenedioxy-3,20-dioxopregnadiene.

A mixture of $\Delta^{1,4}$-6α,11β-difluoro-2-chloro-9α-bromo-16α - methyl-17α,21-(1'-methoxy-3'-carbomethoxy)-propylidenedioxy-3,20-dioxo-pregnadiene in methanol with an aqueous solution of sodium bicarbonate is stirred under nitrogen until the thin-layer chromatographic examination of a specimen of the reaction mixture no longer reveals the presence of starting material. The reaction solution is poured into ice water, acidified with dilute hydrochloric acid and extracted with methylenechloride. The extract is repeatedly washed with water and evaporated and the residue taken up in methanol+ethyl acetate, to furnish pure $\Delta^{1,4}$-6α,11β-difluoro-2-chloro-9α-bromo-16α-methyl-17α,21-(1'-methoxy-3'-carboxy) - propylidenedioxy-3,20-dioxopregnadiene in crystalline form. The new compound is soluble in an aqueous solution of sodium bicarbonate.

A suspension of $\Delta^{1,4}$-6α,11β-difluoro-2-chloro-9α-bromo - 16α - methyl-17α,21-(1'-ethoxy)-propylidenedioxy-3,20-dioxopregnadiene in methanol is treated at 45° C. with a 2 N-aqueous solution of oxalic acid until a clear solution has formed which is poured into an aqueous solution of sodium bicarbonate and extracted with methylenechloride. The extracts are washed with water, dried and evaporated. Crystallization of the residue from ethyl acetate furnishes pure $\Delta^{1,4}$-6α,11β-difluoro-2-chloro-9α-bromo - 16α - methyl-21-hydroxy-17α-propionyloxy-3,20-dioxopregnadiene.

An analogous reaction of $\Delta^{1,4}$-6α,11β-difluoro-2-chloro-9α - bromo-16α-methyl-17α,21-(1'-methoxy)-pentylidenedioxy-3,20-dioxopregnadiene by partial splitting with dilute aqueous oxalic acid furnishes $\Delta^{1,4}$-6α,11β-difluoro-2-chloro - 9α - bromomethyl-21-hydroxy-17α-n-valeroyloxy-3,20-dioxopregnadiene; from $\Delta^{1,4}$-6α,11β-difluoro-2-chloro - 9α - bromo - 16α-methyl-17α,21-(1'-ethoxy)-benzylidenedioxy-3,20-dioxopregnadiene there is obtained $\Delta^{1,4}$-6α,11β - difluoro - 2 - chloro-9α-bromo-16α-methyl-21-hydroxy-17α-benzoyloxy-3,20-dioxopregnadiene, from $\Delta^{1,4}$-6α,11β - difluoro - 2-chloro-9α-bromo-16α-methyl-17α,21-(1'-methoxy-3'-carboxy-propylidenedioxy - 3,20 - dioxopregnadiene $\Delta^{1,4}$-6α,11β-difluoro-2-chloro-9α-bromo-16α-methyl - 21 - hydroxy-17α-hemisuccinoyloxy-3,20-dioxopregnadiene.

EXAMPLE 10

1.17 grams of $\Delta^{1,4,9(11)}$-6α-fluoro-2-chloro-16α-methyl-17α-hydroxy-21-acetoxy-3,20-dioxopregnadiene and 4.0 g. of lithium chloride are dissolved in 75 ml. of diethylacetic acid. The whole is cooled to 0–5° C. and 0.29 g. of dichlorodimethylhydantoin and immediately following 5 ml. of a solution of hydrogen fluoride in chloroform+tetrahydrofuran 3:2, containing 0.270 g. of hydrogen fluoride per ml., are stirred in. The batch is stirred on for 24 hours at room temperature and the reaction solution is then poured into 500 ml. of 10% aqueous sodium carbonate solution. The precipitated reaction products are taken up in methylenechloride. The extracts are washed neutral, dried and evaporated. The crude product is recrystallized from ethyl acetate and furnishes pure $\Delta^{1,4}$ - 6α,11β - difluoro-2,9α-dichloro-16α-methyl-17α-hydroxy-21-acetoxy-3,20-dioxopregnadiene.

$\Delta^{1,4}$-6α,11β-difluoro-2,9α-dichloro - 16α - methyl - 17α-hydroxy-21-acetoxy-3,20-dioxopregnadiene is hydrolyzed as described in Example 2 with sodium bicarbonate in methanol. Recrystallization from methanol furnishes pure $\Delta^{1,4}$-6α,11β-difluoro-2,9α-dichloro-16α-methyl - 17α,21 - dihydroxy-3,20-dioxopregnadiene.

The reaction described in Example 3 of $\Delta^{1,4}$-6α,11β-difluoro-2,9α-dichloro-16α-methyl-17α,21-dihydroxy - 3,20-dioxopregnadiene with trimethylacetylchloride in pyridine furnishes $\Delta^{1,4}$-6α,11β-difluoro-2,9α-dichloro-16α-methyl-17α-hydroxy-21-trimethylacetoxy-3,20-dioxopregnadiene, with benzoylchloride $\Delta^{1,4}$-6α,11β-difluoro-2,9α-dichloro-16α-methyl-17α-hydroxy-21-benzoyloxy-3,20-dioxopregnadiene, with capric acid chloride $\Delta^{1,4}$-6α,11β-difluoro-2,9α-dichloro-16α-methyl-17α-hydroxy-21-caprinoyloxy-3,20-dioxopregnadiene, with undecylenic acid chloride $\Delta^{1,4}$-6α,11β-difluoro-2,9α-dichloro-16α-methyl-17α-hydroxy-21-undecylenoyloxy-3,20-dioxopregnadiene, with-β-phenylpropionylchloride $\Delta^{1,4}$-6α,11β-difluoro-2,9α-dichloro-16α-methyl-17α-hydroxy-21-β-phenylpropionyloxy-3,20-dioxopregnadiene, with methanesulphonylchloride $\Delta^{1,4}$-6α,11β-difluoro-2,9α-dichloro-16α-methyl-17α-hydroxy-21-mesyloxy-3,20-dioxopregnadiene, with diglycollic anhydride $\Delta^{1,4}$-6α,11β-difluoro-2,9α-dichloro-16α-methyl-17α-hydroxy-21 hemidiglycoloyloxy-3,20-dioxopregnadiene, with succinic anhydride $\Delta^{1,4}$-6α,11β-difluoro-2,9α-dichloro-16α-methyl-17α-hydroxy-21-hemisuccinoyloxy-3,20-dioxopregnadiene, with tetrahydrophthalic anhydride $\Delta^{1,4}$-$6\alpha,11\beta$-difluoro-2,9$\alpha$-dichloro-16$\alpha$-methyl-17$\alpha$-hydroxy-21-hemitetrahydrophthaloyloxy-3,20-dioxopregnadiene, with phthalic anhydride $\Delta^{1,4}$-$6\alpha,11\beta$-difluoro-2,9$\alpha$-dichloro-16$\alpha$-methyl-17$\alpha$-hydroxy-21-hemiphthaloyloxy-3,20-dioxopregnadiene, with quinolic anhydride $\Delta^{1,4}$-$6\alpha,11\beta$-difluoro-2,9$\alpha$-dichloro-16$\alpha$-methyl-17$\alpha$-hydroxy-21-hemiquinoloyloxy-3,20-dioxopregnadiene, with propionic anhydride $\Delta^{1,4}$-$6\alpha,11\beta$-difluoro-2,9-dichloro-16$\alpha$-methyl-17$\alpha$-hydroxy-21-propionyloxy-3,20-dioxopregnadiene, with chloroacetylchloride $\Delta^{1,4}$-$6\alpha,11\beta$-difluoro-2,9$\alpha$-dichloro-16$\alpha$-methyl-17$\alpha$-hydroxy-21-chloroacetoxy-3,20-dioxopregnadiene, with cyclopentylpropionylchloride $\Delta^{1,4}$-$6\alpha,11\beta$-difluoro-2,9$\alpha$-dichloro-16$\alpha$-methyl-17$\alpha$-hydroxy-21-$\beta$-cyclopentylpropionyloxy-3,20-dioxopregnadiene.

When $\Delta^{1,4}$-$6\alpha,11\beta$-difluoro-2,9$\alpha$-dichloro-16$\alpha$-methyl-17$\alpha$,21-dihydroxy-3,20-dioxopregnadiene is reacted with methyl iodide in the presence of silver oxide and dimethylformamide it yields $\Delta^{1,4}$-$6\alpha,11\beta$-difluoro-2,9$\alpha$-dichloro-16$\alpha$-methyl-17$\alpha$-hydroxy-21-methoxy-3,20-dioxopregnadiene, with ethyl iodide $\Delta^{1,4}$-$6\alpha,11\beta$-difluoro-2,9$\alpha$-dichloro-16$\alpha$-methyl-17$\alpha$-hydroxy-21-ethoxy-3,20-dioxopregnadiene, with allyl iodide $\Delta^{1,4}$-$6\alpha,11\beta$-difluoro-2,9$\alpha$-dichloro-16$\alpha$-methyl-17$\alpha$-hydroxy-21-allyloxy-3,20-dioxopregnadiene, with benzylchloride $\Delta^{1,4}$-$6\alpha,11\beta$-difluoro-2,9$\alpha$-dichloro-16$\alpha$-methyl-17$\alpha$-hydroxy-21-benzoyloxy-3,20-dioxopregnadiene.

A mixture of $\Delta^{1,4}$-$6\alpha$-$11\beta$-difluoro-2,9$\alpha$-dichloro-16$\alpha$-methyl-17$\alpha$,21-dihydroxy-3,20-dioxopregnadiene, 3,4-dihydropyran and p-toluenesulphonic acid monohydrate is stirred at room temperature until starting material can be no longer be identified by thin-layer chromatography of a specimen of the reaction mixture. The p-toluenesulphonic acid is neutralized with pyridine and the reaction solution is completely evaporated under vacuum. Recrystallisation of the residue from ethyl acetate furnishes pure $\Delta^{1,4}$-$6\alpha,11\beta$-difluoro-2,9$\alpha$-dichloro-16$\alpha$-methyl-17$\alpha$-hydroxy-21-(2'-tetrahydropyranyloxy)-3,20-dioxopregnadiene.

When $\Delta^{1,4}$-$6\alpha,11\beta$-difluoro-2,9$\alpha$-dichloro-16$\alpha$-methyl-17$\alpha$,21-dihydroxy-3,20-dioxopregnadiene is reacted in identical manner it furnishes with 2,5-dihydrofuran $\Delta^{1,4}$-$6\alpha,11\beta$-difluoro-2,9$\alpha$-dichloro-16$\alpha$-methyl-17$\alpha$-hydroxy-21-(2'-tetrahydrofuranyloxy)-3,20-dioxopregnadiene, with methylvinyl ether $\Delta^{1,4}$-$6\alpha,11\beta$-difluoro-2,9$\alpha$-dichloro-16$\alpha$-methyl-17$\alpha$-hydroxy-21-(1'-methoxyethoxy)-3,20-dioxopregnadiene, with phenylvinyl ether $\Delta^{1,4}$-$6\alpha,11\beta$-difluoro-2,9$\alpha$-dichloro-16$\alpha$-methyl-17$\alpha$-hydroxy-21-(1'-phenyloxyethoxy)-3,20-dioxopregnadiene, with n-butyl ether $\Delta^{1,4}$-$6\alpha,11\beta$-difluoro-2,9$\alpha$-dichloro-16$\alpha$-methyl-17$\alpha$-hydroxy-21-(1'-n-butoxyethoxy)-3,20-dioxopregnadiene, with isobutylvinyl ether $\Delta^{1,4}$-$6\alpha,11\beta$-difluoro-2,9$\alpha$-dichloro-16$\alpha$-methyl-17$\alpha$-hydroxy-21-(1'-isobutoxyethoxy)-3,20-dioxopregnadiene, with cetylvinyl ether $\Delta^{1,4}$-$6\alpha,11\beta$-difluoro-2,9$\alpha$-dichloro-16$\alpha$-methyl-17$\alpha$-hydroxy-21-(1'-cetyloxyethoxy)-3,20-dioxopregnadiene, with n-octadecylvinyl ether $\Delta^{1,4}$-$6\alpha,11\beta$-difluoro-2,9$\alpha$-dichloro-16$\alpha$-methyl-17$\alpha$-hydroxy-21-(1'-n-octadecyloxyethoxy)-3,20-dioxopregnadiene and with benzylvinyl ether $\Delta^{1,4}$-$6\alpha,11\beta$-difluoro-2,9$\alpha$-dichloro-16$\alpha$-methyl-17$\alpha$-hydroxy-21-(1'-benzyloxyethoxy)-3,20-dioxopregnadiene.

$\Delta^{1,4}$-$6\alpha,11\beta$-difluoro-2,9$\alpha$-dichloro-16$\alpha$-methyl-17$\alpha$,21-dihydroxy-3,20-dioxopregnadiene is reacted as described in Example 4 with orthopropionic acid triethyl ester to yield $\Delta^{1,4}$-$6\alpha,11\beta$-difluoro-2,9$\alpha$-dichloro-16$\alpha$-methyl-17$\alpha$,21-(1'-ethoxy)-propylidenedioxy-3,20-dioxopregnadiene which by partial hydrolysis according to Example 5 with dilute oxalic acid in methanol furnishes $\Delta^{1,4}$-$6\alpha$-$11\beta$-difluoro-2,9$\alpha$-dichloro-16$\alpha$-methyl-21-hydroxy-17$\alpha$-propionoxy-3,20-dioxopregnadiene which, on esterification with propionic anhydride in pyridine, gives rise to $\Delta^{1,4}$-$6\alpha,11\beta$-difluoro-2,9$\alpha$-dichloro-16$\alpha$-methyl-17$\alpha$,21-dipropionyloxy-3,20-dioxopregnadiene.

An analogous reaction of $\Delta^{1,4}$-$6\alpha,11\beta$-difluoro-2,9$\alpha$-dichloro-16$\alpha$-methyl-17$\alpha$,21-dihydroxy-3,20-dioxopregnadiene with orthovaleric acid trimethyl ester furnishes $\Delta^{1,4}$-$6\alpha,11\beta$-difluoro-2,9$\alpha$-dichloro-16$\alpha$-methyl-17$\alpha$,21-(1'-methoxy)-pentylidenedioxy-3,20-dioxopregnadiene and from it $\Delta^{1,4}$-$6\alpha,11\beta$-difluoro-2,9$\alpha$-dichloro-16$\alpha$-methyl-21-hydroxy-17$\alpha$-n-valeroyloxy-3,20-dioxopregnadiene and $\Delta^{1,4}$-$6\alpha,11\beta$-difluoro-2,9$\alpha$-dichloro-16$\alpha$-methyl-17$\alpha$-valeroyloxy-21-propionyloxy-3,20-dioxopregnadiene are obtained, by reaction with orthobenzoic acid triethyl ester $\Delta^{1,4}$-$6\alpha,11\beta$-difluoro-2,9$\alpha$-dichloro-16$\alpha$-methyl-17$\alpha$,21-(1'-ethoxy)-benzylidenedioxy-3,20-dioxopregnadiene, and from it $\Delta^{1,4}$-$6\alpha,11\beta$-difluoro-2,9$\alpha$-dichloro-16$\alpha$-methyl-21-hydroxy-17$\alpha$-benzoyloxy-3,20-dioxopregnadiene and $\Delta^{1,4}$-$6\alpha,11\beta$-difluoro-2,9$\alpha$-dichloro-16$\alpha$-methyl-17$\alpha$-benzoyloxy-21-propionyloxy-3,20-dioxopregnadiene, with cyclopentanone diethyl acetal $\Delta^{1,4}$-$6\alpha,11\beta$-difluoro-2,9$\alpha$-dichloro-16$\alpha$-methyl-17$\alpha$,21-cyclopentylidene-dioxy-3,20-dioxopregnadiene, with cyclohexanone diethyl acetal $\Delta^{1,4}$-$6\alpha,11\beta$-difluoro-2,9$\alpha$-dichloro-16$\alpha$-methyl-17$\alpha$,21-cyclohexylidenedioxy-3,20-dioxopregnadiene, with benzaldehyde diethyl acetal $\Delta^{1,4}$-$6\alpha,11\beta$-difluoro-2,9$\alpha$-dichloro-16$\alpha$-methyl-17$\alpha$,21-benzylidenedioxy-3,20-dioxopregnadiene, with $\beta$-carbomethoxy-orthopropionic acid trimethyl ester $\Delta^{1,4}$-$6\alpha,11\beta$-difluoro-2,9$\alpha$-dichloro-16$\alpha$-methyl-17$\alpha$,21-(1'-methoxy-3'-carbomethoxy)-propylidenedioxy-3,20-dioxopregnadiene and from it by hydrolysis with sodium bicarbonate $\Delta^{1,4}$-$6\alpha,11\beta$-difluoro-2,9$\alpha$-dichloro-16$\alpha$-methyl-17$\alpha$,21-(1'-methoxy-3'-carboxy)-propylidenedioxy-3,20-dioxopregnadiene and from it by partial hydrolysis $\Delta^{1,4}$-$6\alpha,11\beta$-difluoro-2,9$\alpha$-dichloro-16$\alpha$-methyl-21-hydroxy-17$\alpha$-hemisuccinoyloxy-3,20-dioxopregnadiene.

EXAMPLE 11

A pharmaceutical preparation in form of ointments for local administration, containing as active ingredient $\Delta^{1,4}$-$6\alpha$-fluoro-$2,9\alpha,11\beta$-trichloro-16$\alpha$-methyl-17$\alpha$-hydroxy-21-trimethylacetoxy-3,20-dioxopregnadiene:

Composition

| | Percent |
|---|---|
| White petroleum jelly | } 65.0 |
| Paraffin oil | |
| Higher aliphatic alcohols | } 10.0 |
| Waxes | |
| Polyhydroxyethylene-sorbitan derivatives | } 4.68 |
| Sorbitan fatty acid esters | |
| Preservative | 0.2 |
| Perfume | 0.1 |
| Water | 20.0 |
| $\Delta^{1,4}$-$6\alpha$-fluoro-$2,9\alpha,11\beta$-trichloro-16$\alpha$-methyl-17$\alpha$-hydroxy-21-trimethylacetoxy-3,20-dioxopregnadiene | 0.02 |

Formulation

The fats and the emulsifiers are melted together, the preservative is dissolved in water and this aqueous solution is emulsified with the melt at an elevated temperature. During the cooling of the resulting emulsion a suspension of the active ingredient in a part of the melt is admixed with emulsion and the perfume is then added.

EXAMPLE 12

A pharmaceutical preparation in form of ointments for local administration, containing as active ingredient $\Delta^{1,4}$-6α-fluoro-2,9α,11β-trichloro-16α-methyl-17α-hydroxy-21-acetoxy-3,20-dioxopregnadiene:

Composition

|  | Percent |
|---|---|
| White petroleum jelly | } 65.0 |
| Paraffin oil |  |
| Higher aliphatic alcohols | } 10.0 |
| Waxes |  |
| Polyhydroxyethylene-sorbitan derivatives | } 4.60 |
| Sorbiton-fatty acid esters |  |
| Preservative | 0.2 |
| Perfume | 0.1 |
| Water | 20.0 |
| $\Delta^{1,4}$-6α-fluoro-2,9α,11β-trichloro-16α-methyl-17α-hydroxy-21-acetoxy-3,20-dioxopregnadiene | 0.1 |

Formulation

The fats and the emulsifiers are melted together, the preservative is dissolved in water and this aqueous solution is emulsified with the melt at an elevated temperature. During the cooling of the resulting emulsion a suspension of the active ingredient in a part of the melt is admixed with the emulsion and the perfume is then added.

EXAMPLE 13

5.0 g. of $\Delta^{1,4}$-6α-fluoro-9α,11β-dichloro-16α-methyl-17α-hydroxy-21-acetoxy-3,20-dioxo-pregnadiene are dissolved in 250 ml. of dioxan. After cooling, and until crystallization of the dioxan sets in, there are gradually added in the course of 8 days at 0–5° C. in the dark 215 ml. of a solution of 72 g. of chlorine in 1000 ml. of propionic acid in portions of 20–30 ml. The reaction solution is then poured into 3 liters of ice-water. The batch is extracted several times with methylene chloride and the extracts are washed successively with water, saturated aqueous sodium bicarbonate solution, and water. The extracts are combined and dried over sodium sulfate, filtered, and completely evaporated under reduced pressure at a bath temperature of 30–35° C. The resulting crude $\Delta^4$-6α-fluoro-1,2,9α,11β-tetrachloro-16α-methyl-17α-hydroxy-21-acetoxy-3,20-dioxopregnene (9.5 g.) is dissolved in 300 ml. of pyridine and the solution allowed to stand at room temperature for 20 hours, during which its color gradually changes from yellowish brown to dark brown. The reaction solution is then poured into 6 liters of ice-cooled N-hydrochloric acid. The batch is extracted four times with 1 liter of methylene chloride each time, and the extracts are washed successively with ice-cooled N-hydrochloric acid, water, saturated aqueous sodium bicarbonate solution, and water. The extracts are then combined and dried over sodium sulfate, filtered, and completely evaporated under reduced pressure. For purification, the resulting crude product (6.27 g.) is dissolved in methylene chloride, filtered through a column of silica gel, and eluted further with methylene chloride. The middle fraction which according to thin-layer chromatography is unitary is recrystallized from methylene chloride+ether to obtain $\Delta^{1,4}$-6α-fluoro-2,9α,11β-trichloro-16α-methyl-17α-hydroxy-21-acetoxy-3,20-dioxo-pregnadiene melting at (247°) 248–249° C. (with decomposition).

On working up, further quantities of the same product are obtained from the mother liquor.

What is claimed is:

1. A compound of the formula in which $R_1$ represents hydrogen, a methyl group or a halogen atom, $R_2$ stands for hydrogen or an α- or β-positioned methyl group, $R_3$ for a free or esterified hydroxyl group, and $R_4$ for a free, esterified or etherified hydroxyl group, and X and Y each stands for a halogen atom, each of said esterified hydroxyl groups being derived from carboxylic acids having 1 to 18 carbon atoms and each of said etherified hydroxyl groups being derived from lower aliphatic alcohols having 1 to 8 carbon atoms or tetrahydro-pyranol.

2. A compound of the formula shown in claim 1, the esterified hydroxy groups of which are derived from carboxylic acids having 1 to 18 carbon atoms.

3. A compound of the formula shown in claim 1, the esterified hydroxy groups of which are derived from lower aliphatic carboxylic acids.

4. A compound of the formula shown in claim 1, the esterified hydroxy groups of which are derived from lower aliphatic ortho-carboxylic acids.

5. A compound of the formula shown in claim 1, the etherified hydroxy groups of which are derived from lower aliphatic alcohols having 1 to 8 carbon atoms.

6. A compound of the formula shown in claim 1, wherein the etherified hydroxyl groups are derived from tetrahydropyranol.

7. A 21-monoester according to claim 1.

8. A 17-monoester according to claim 1.

9. A 17,21-diester according to claim 1.

10. A member selected from the group consisting of $\Delta^{1,4}$-6α-fluoro-2,9α,11β-trichloro-16α-methyl-17α,21-dihydroxy-3,20-dioxo-pregnadiene and a mono- or di-ester thereof derived from carboxylic acids having 1 to 18 carbon atoms.

11. The 21-acetate of the compound claimed in claim 10.

12. The 21-trimethylacetate of the compound claimed in claim 10.

13. A member selected from the group consisting of $\Delta^{1,4}$-6α,11β-difluoro-2-chloro-9α-bromo-16α-methyl-17α-hydroxy-21-acetoxy-3,20-dioxo-pregnadiene and a mono- or di-ester thereof derived from carboxylic acids having 1 to 18 carbon atoms.

14. The 21-acetate of the compound claimed in claim 13.

15. The 31-trimethylacetate of the compound claimed in claim 13.

16. A compound of claim 10, which is $\Delta^{1,4}$-6α-fluoro-2,9α,11β-trichloro-16α-methyl-17α,21-dihydroxy-3,20-dioxo-pregnadiene.

17. A compound of claim 13, which is $\Delta^{1,4}$-6α,11β-difluoro-2-chloro-9α-bromo-16α-methyl-17α-hydroxy-21-acetoxy-3,20-dioxo-pregnadiene.

No references cited.

HENRY A. FRENCH, Primary Examiner

U.S. Cl. X.R.

260—239.55; 424—243